(12) United States Patent
Stanley Calvo

(10) Patent No.: US 12,252,345 B2
(45) Date of Patent: Mar. 18, 2025

(54) REINFORCEMENT SYSTEM AND METHOD FOR SUPPORTING STACKED BOXES AND CONTAINERS

(71) Applicant: Roberto Tomás Stanley Calvo, Santiago (CL)

(72) Inventor: Roberto Tomás Stanley Calvo, Santiago (CL)

(*) Notice: Subject to any disclaimer, the term of this patent is extended or adjusted under 35 U.S.C. 154(b) by 0 days.

(21) Appl. No.: 18/682,777

(22) PCT Filed: Sep. 14, 2021

(86) PCT No.: PCT/CL2021/050085
§ 371 (c)(1),
(2) Date: Feb. 9, 2024

(87) PCT Pub. No.: WO2023/035090
PCT Pub. Date: Mar. 16, 2023

(65) Prior Publication Data
US 2024/0359922 A1 Oct. 31, 2024

(30) Foreign Application Priority Data
Sep. 9, 2021 (CL) .................................. 2364-2021

(51) Int. Cl.
*B65G 1/14* (2006.01)
*B65D 5/00* (2006.01)
(Continued)

(52) U.S. Cl.
CPC ............... *B65G 1/14* (2013.01); *B65D 5/006* (2013.01); *B65D 21/02* (2013.01); *B65D 57/00* (2013.01); *B65D 5/001* (2013.01)

(58) Field of Classification Search
CPC .......... B65G 1/14; B65D 5/006; B65D 5/001; B65D 5/00; B65D 5/002; B65D 19/00;
(Continued)

(56) References Cited

U.S. PATENT DOCUMENTS 1,200,467 A * 10/1916 Cady ..................... B65D 63/10
206/323
3,834,324 A * 9/1974 Lang .................. A47B 87/0246
108/190
(Continued)

FOREIGN PATENT DOCUMENTS

DE 4312214 C1 * 9/1994 ............... B65G 1/14
DE 102005029120 A1 * 12/2006 ............. B65D 19/44
(Continued)

OTHER PUBLICATIONS

PCT/CL2021/050085, "International Seach Report and Written Opinion", PCT Application No. PCT/CL2021/050085, Mar. 22, 2022, 13 pages.
(Continued)

*Primary Examiner* — Stanton L Krycinski
(74) *Attorney, Agent, or Firm* — FIG. 1 Patents

(57) ABSTRACT

The present invention relates to a reinforcement system and method for supporting stacked containers or boxes, without resulting in damage to the contents and the containers themselves. The system comprises at least one pillar element (1) and at least one end shoulder element (2), where the at least one pillar element (1) is arranged in at least one corner of the stack formed by the containers, and where the at least one end shoulder element (2) is arranged at the lower and upper ends of each of the vertical corners of containers stack, where the pillar element (1) has a smaller dimension as measured by the sum of the containers heights along a vertical corner of the container stack between the terminal shoulder elements (2), so that the boxes or containers absorb part of the load before the pillar element (1) comes into contact with the upper terminal shoulder.

10 Claims, 16 Drawing Sheets

(51) Int. Cl.
  *B65D 21/02*   (2006.01)
  *B65D 57/00*   (2006.01)
(58) Field of Classification Search
  CPC ........ B65D 19/38; B65D 21/00; B65D 21/02;
          B65D 21/0209; B65D 57/00
  See application file for complete search history.

(56) References Cited

U.S. PATENT DOCUMENTS

| | | | |
|---|---|---|---|
| 4,201,138 A | 5/1980 | Cox | |
| 4,265,184 A | 5/1981 | Cox | |
| 4,292,901 A | 10/1981 | Cox | |
| 4,553,484 A * | 11/1985 | Cox | B65D 19/06 |
| | | | 403/353 |
| 4,619,365 A | 10/1986 | Kelly et al. | |
| 4,787,553 A * | 11/1988 | Hoskins | B65D 5/006 |
| | | | 206/821 |
| 5,115,917 A * | 5/1992 | Schrage | B65D 11/22 |
| | | | 108/55.1 |
| 5,450,961 A * | 9/1995 | Gottfried | G11B 23/027 |
| 6,012,587 A * | 1/2000 | McCullough | B65D 81/054 |
| | | | 493/137 |
| 7,066,342 B2 | 6/2006 | Baechle | |
| 8,251,222 B2 * | 8/2012 | Rego Garcia De Alba | |
| | | | B65D 19/385 |
| | | | 220/4.28 |
| 8,297,492 B2 * | 10/2012 | Muyskens | B65D 5/5033 |
| | | | 229/199 |
| 8,469,191 B2 * | 6/2013 | Steinhoff | B65D 19/385 |
| | | | 206/386 |
| 8,561,801 B2 * | 10/2013 | Grenchus, Jr. | B65D 81/056 |
| | | | 206/453 |
| 9,061,822 B2 * | 6/2015 | Ness | B65D 90/54 |
| 9,272,832 B2 | 3/2016 | Grinwald et al. | |
| 9,783,333 B1 * | 10/2017 | De Los Santos | B65D 5/006 |
| 10,822,138 B1 | 11/2020 | Voorhees | |
| 11,866,082 B2 * | 1/2024 | Carboni | B65G 1/14 |
| 2009/0032432 A1 * | 2/2009 | Kostos | B65D 5/0065 |
| | | | 206/600 |
| 2019/0263562 A1 | 8/2019 | Fry | |

FOREIGN PATENT DOCUMENTS

| | | | | |
|---|---|---|---|---|
| FR | 2613694 A3 * | 10/1988 | | |
| JP | 2002114226 | 4/2002 | | |
| WO | WO-2017086501 A1 * | 5/2017 | ............ | B65D 19/02 |
| WO | 2019202500 A1 | 10/2019 | | |
| WO | 2023035090 | 3/2023 | | |

OTHER PUBLICATIONS

Registration Acceptance Decision (New Law) for Chile Application No. 2021-02364 dated Apr. 11, 2024.
Examiner's Technical Report (ITE) Suggesting Acceptance to Registration for Chile Application No. 2021-02364 dated Feb. 21, 2024.
Office Action (Expert Report) for Chile Application No. 2021-02364, dated Oct. 3, 2023.
Office Action (Expert Report) for Chile Application No. 2021-02364, dated Mar. 28, 2023.
Search Report: Office Action 1 for Chile Application No. 2021-02364, dated Mar. 28, 2023.
Search Report: Office Action 2 for Chile Application No. 2021-02364, dated Mar. 28, 2023.

* cited by examiner

REINFORCEMENT SYSTEM AND METHOD FOR SUPPORTING STACKED BOXES AND CONTAINERS

FIELD OF THE INVENTION

The invention relates to a reinforcement system and method for supporting boxes. Said reinforcement system and method are composed by a plurality of elements that interact together to collaboratively support with the boxes, the weight of the content of said boxes. The system allows to reduce the need of the use of boxes or contains configured with higher resistance materials.

BACKGROUNDS

One of the main stages that are part of some industries corresponds to the transport of packed material. It is very frequent that the materials will be packed in containers or boxes made of different material and dimension, according to the contents and transported volume. Often said containers or boxes are usually transported in stacks, which present two main problems: damage over the container due to the weight of the containers stacked on said container and the difficulty of transporting the containers in motion, since they can slide or move from one of another.

In this way, the prior art intends to solve said problems in different manners. A solution of this type is the one disclosed by document WO2017086501 A1, which describes a packaging box having a post angle for reinforcing a packaging container integrally with a pallet. A pallet bracket which is fastened to the upper edge of the pallet and has a plurality of fastening holes at one side and a side fastening groove to be engaged with the post angle, the post angle standing on a corner of the pallet bracket and having a force bar on one side. The document also describes a container coupled to the post angle and defining an interior receiving portion with a wall surface; and a container cover covering the upper end of the container. The post angle comprises a bent portion provided at an upper end portion and having a grip portion for fixing the one side portion of the container to the container. It also includes an edge member provided on the outer surface of the container. Furthermore, it describes a vertical support comprising a vertical plate with a U-shape and a horizontal plate connected to a side of the vertical plate and contacting to upper end of the pallet.

Another solution is described by document KR101481638 B1 which discloses a packing box allowing on-site assembly. The box comprises reinforcing and supporting structures formed at respective corners of a box member whose four outer wall surfaces are connected by the corners, comprising an inner supporting member and an outer supporting member. The inner supporting member and the outer supporting member are fixed between them by a fixing clip which is a mean that can be easily attached to each corner of the rectangular box member. The fixing clip is inserted into the upper and lower portions of each corner of the box member in which the inner supporting member and the outer supporting member are disposed, and hence the inner edge of each corner. The inner supporting member and the outer supporting member are configured to adhere to each corner.

These solutions try to improve the structure of the box or container to support a greater stacking load, and at the same time, provide means that allow to secure one container with another. However, these solutions require the use specifically of said containers and they are not applicable for containers that do not have intrinsically installed reinforcing elements.

In this sense, the market presents solutions that can be implemented in containers that are not necessarily modified, which area mainly related to support the corners of stacked containers, in particular, carboard boxes (https://www.youtube.com/watch?v=Q8XZTX4_nss&t=29s), wherein an element is arranged on an upper corner of a container, said element comprises a base in the middle portion allowing to receive the corner of an upper container. The element also comprises a clamp to secure the element on the lower container, without slipping during transport. However, this kind of solution does not allow stacking more than one column of stacked containers, since the structural unit of more than one column could not be maintained during transportation.

In conclusion, there is a need to implement a reinforcement system and method to support containers or boxes that allowing to maintain the structural unit of said stacked containers and that, in turn, allow that said containers support the load of the rest of the containers, without alteration that damage their content.

SUMMARY OF THE INVENTION

The present invention is related to a reinforcement system and method composed by a series of elements that interact each and other to collaboratively hold with containers or boxes, the weight of the content it said containers or boxes. The system allows to reduce the need of having containers configured with higher resistance materials, since said system allows a better distribution of load over the containers, avoiding in this way the damage by the stacking weight and by any displacement that can be produced during the transportation.

The system is configured by three elements: pillar element; end shoulder element and, optionally, an intermediate shoulder element. The pillar element is configured as an elongated profile with a L-shape cross section, intended to maintain the structural unity of vertical corners of stacked containers. The intermediate shoulder element is configured as a profile with a L-shape cross section, whose inner part is symmetrically separated by a plane, said plane arranged in the central portion of the profile vertical respect to the internal surface of the profile. The end shoulder element is configured as a profile with a L-shape cross section, closed in one end.

The system work placing the end shoulder element on the upper and lower corners of the stack of boxes or containers and installing intermediate shoulder elements in intermediate zones of the stack, if necessary. Also, it is arranged a pillar of smaller dimension to the sum of heights of boxes or containers along one edge of containers stack between terminal shoulder elements, so the boxes or containers absorb part pf the load before the pillar contact the upper end shoulder element.

In an embodiment of the invention, when the stacking of more than one column of boxes or containers is required, it can arrange at least an internal column, which is arranged at the junction of four corners of boxes or containers. This junction comprises an upper and lower end supports and at least one pillar, similar as it was described before. End supports are conformed by a flat base and four pieces with a L-shape cross section. Said four pieces are vertically arranged respect to the flat base, conforming a cross-shape structure with a space between these pieces, wherein said space is arranged to the installation of pillars.

Finally, the step of placing straps or tying the system and the containers can be incorporated, so that the portion of the containers stack covered by the system is fixed or joined, and thus prevents the pillar elements from separating from the containers stack.

In this way, the described system allows the absorption of loads resulting from the stacking of one or more stacks of containers, without resulting in damage to the content and the containers themselves.

DETAILED DESCRIPTION OF THE INVENTION

As detailed below, the reinforcement system consists of three elements: at least one pillar element (1), at least one end shoulder element (2) and, optionally, at least one intermediate shoulder element (3). Said elements are configured depending on the way of stacking of containers. That is, the elements to be use and their quantities will depend on the number of sections that make up the stack being defined by the number of roes that make up the containers.

In this way, each element contributes to maintain the structure of the container stack. The pillar element (1) allows to maintain the structural unit of various sections of containers stack along the vertical edges defined by said stack. The end shoulder element (2) allows the structural unit to be maintained at the lower and upper ends of each of the corners of the containers stack.

The intermediate shoulder element (3) allows to maintain the structural unit between consecutive container sections. Each intermediate shoulder element (3) is not necessarily installed in space between consecutive sections, but it can be installed in an intermediate portion of containers stack, depending on the requirement and the size of said stack.

Figure 6:
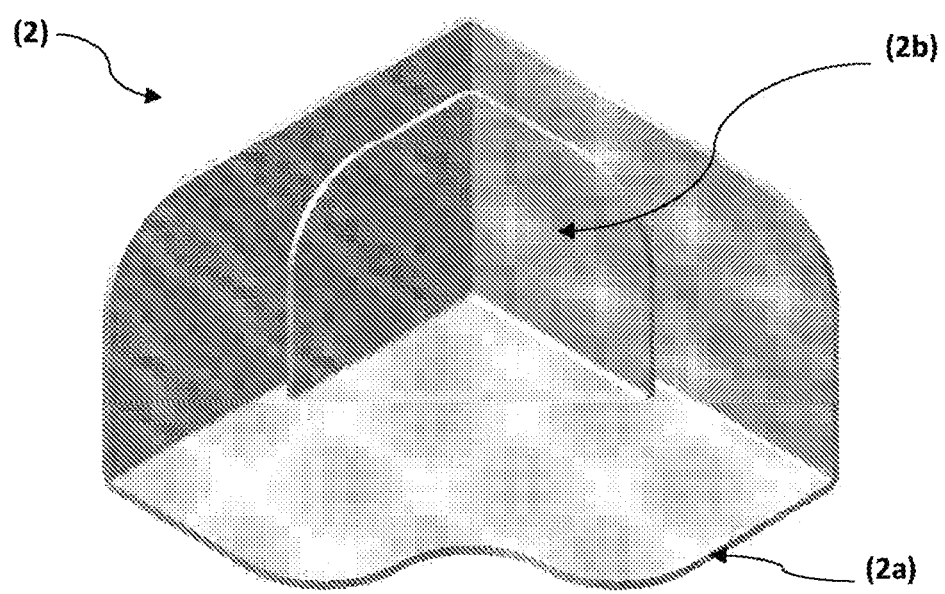
FIG. 6 represents a view of an end shoulder element, according to an embodiment of the invention.
Figure 7:
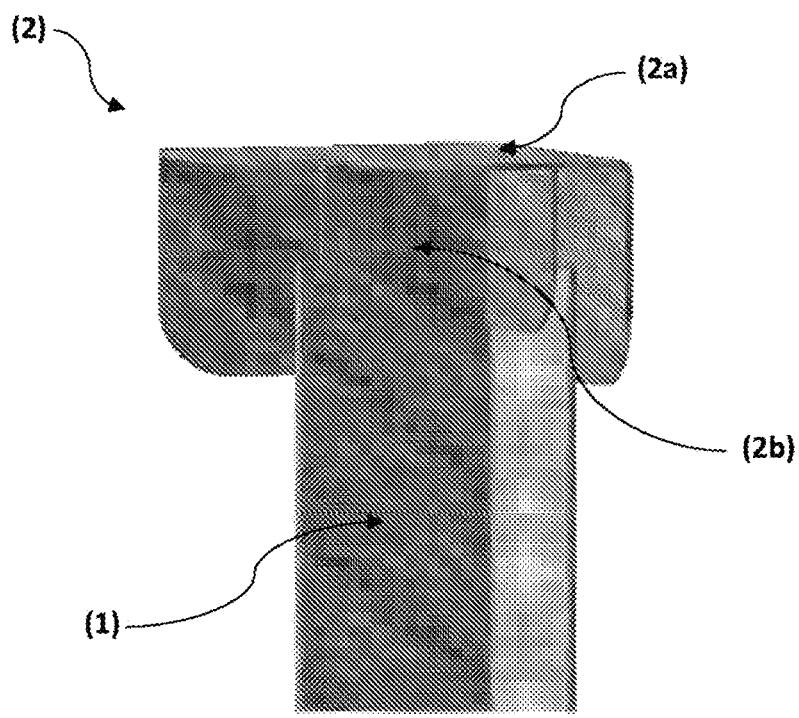
FIG. 7 represents a view of an end shoulder element arranged on the upper portion together with a pillar element, according to an embodiment of the invention.
Figure 8:
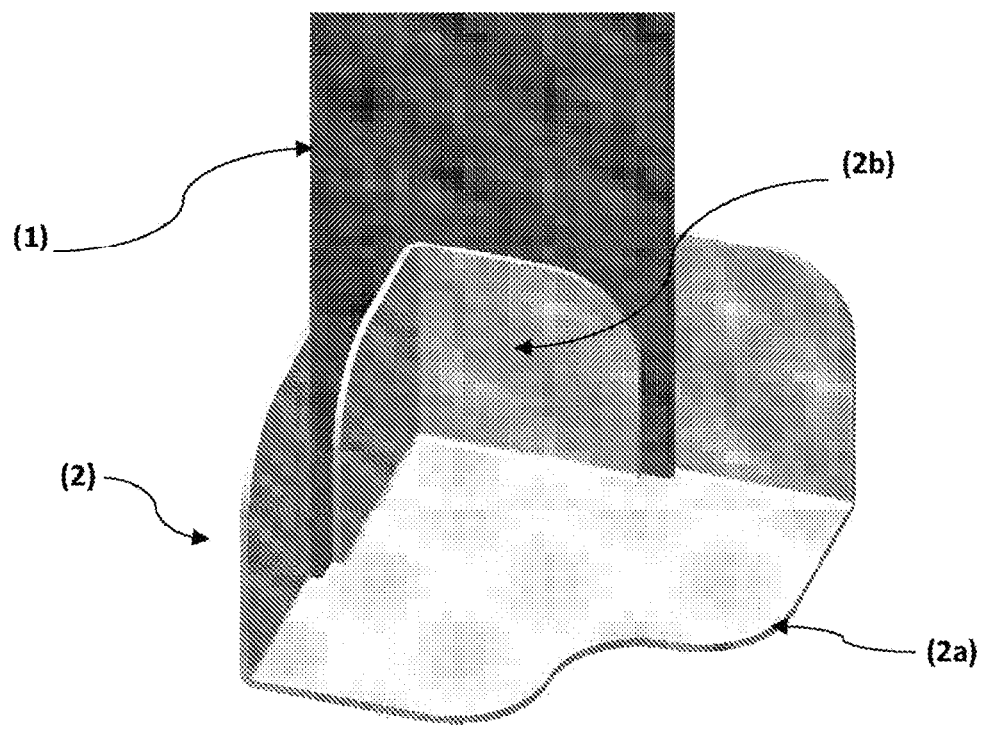
FIG. 8 represents a view of an end shoulder element arranged on the lower portion together with a pillar element, according to an embodiment of the invention.
Figure 9:
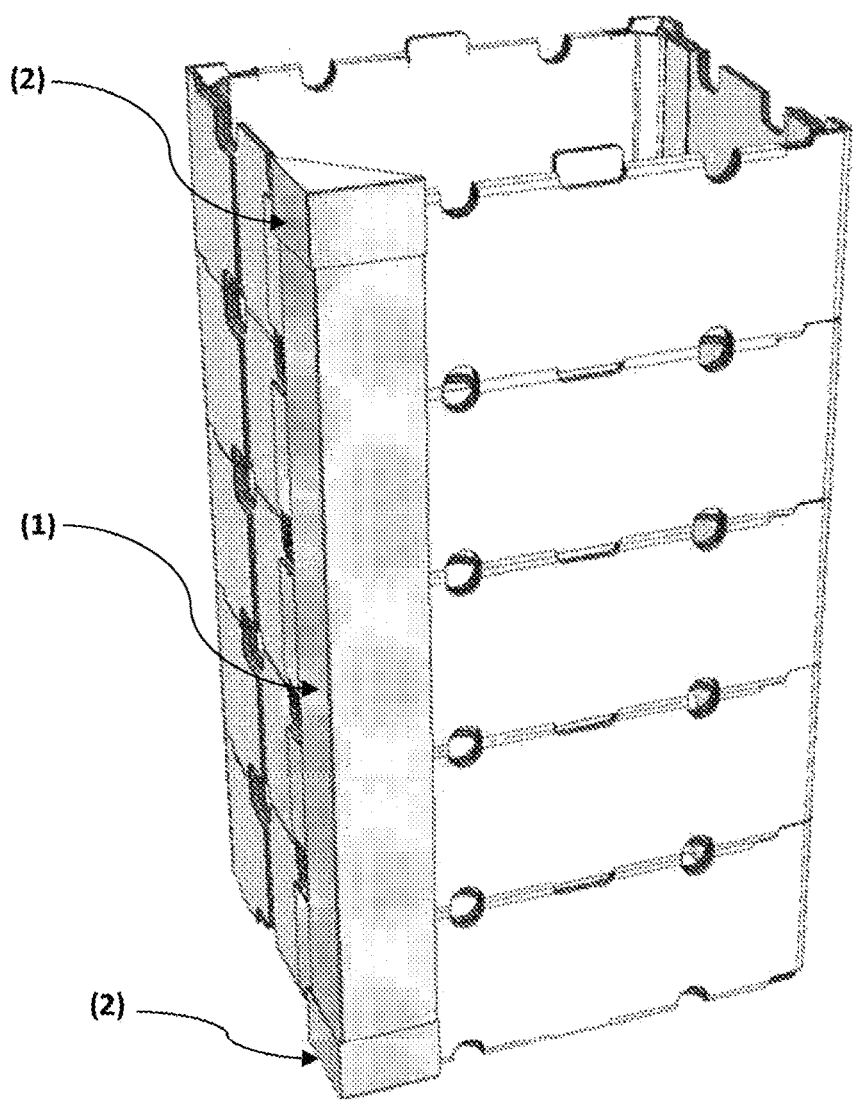
FIG. 9 represents a view of set of stacked boxes in a column, supported by end shoulder elements and one pillar element, according to an embodiment of the invention.
Figure 10:
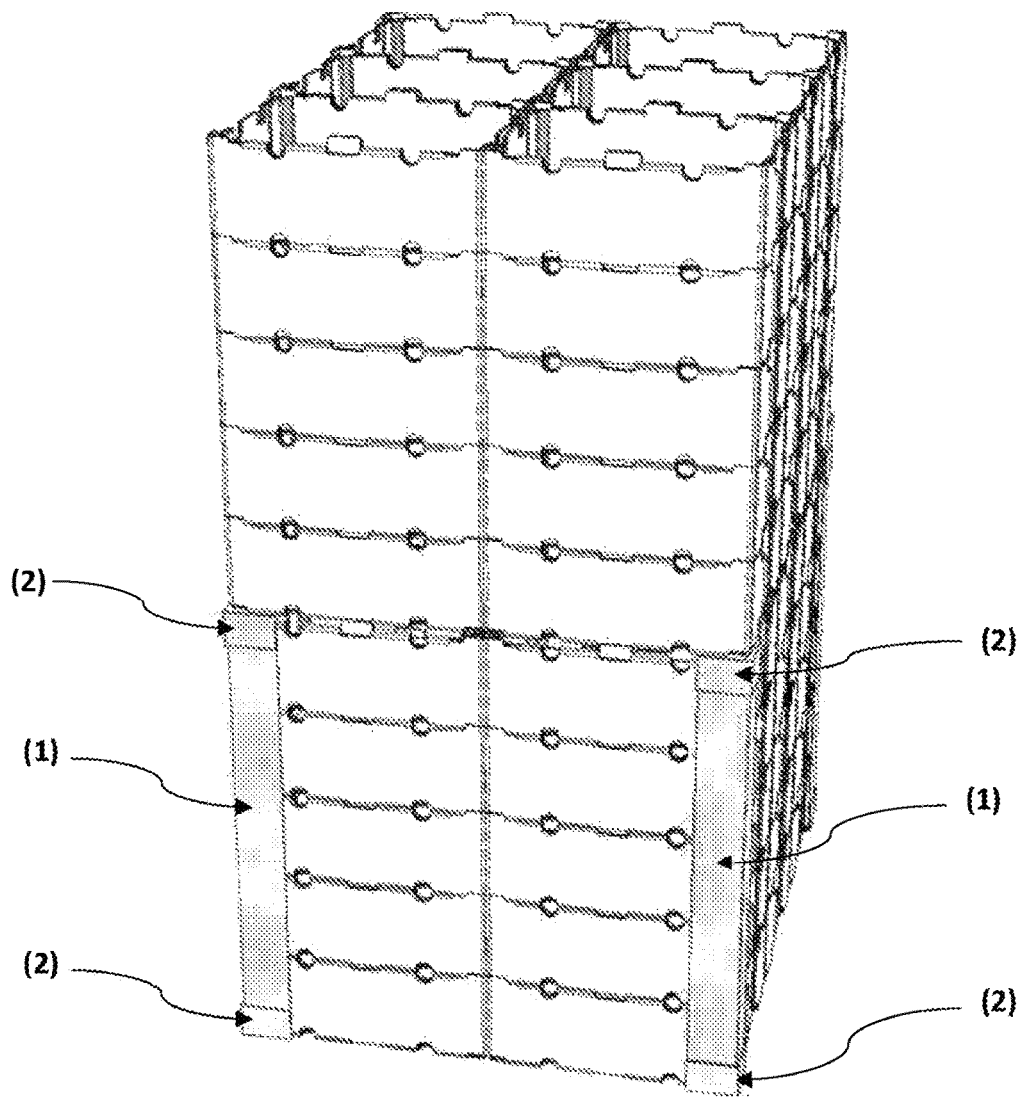
FIG. 10 represents a view of set of stacked boxes in six columns, supported by end shoulder elements, one pillar element and one intermediate shoulder element, as an example, according to an embodiment of the invention.

In one embodiment of the invention, the pillar element (1) is configured as an elongated profile with a L-shape cross section, wherein the length of said pillar element (1) depends on the size of the stack and where an intermediate shoulder element (3) is available. The end shoulder element (2) is configured as a profile with an L-shape cross section, where one of its ends is open and the opposite end is closed by a closure plate (2*a*). In the inside of end shoulder element (2) is arranged a clamping element (2*b*) of pillar element (1), said clamping element (2*b*) having a L-shape cross-section profile, whose dimension is less than or equal to the longitudinal dimension of the end shoulder element (2), as seen in FIG. 6. In this way, the pillar element (1) is inserted between the inner wall of the end shoulder element (2) and the clamping element (2*b*), thus maintaining the vertical position of the pillar element (1), as can be seen in FIGS. 7 and 8.

The end shoulder element (2) is arranged at each upper and lower corner of the container stack. In this way, the closure plate (2*a*) allows to limit the vertical movement of the container that is at the bottom of the containers stack and the container that is at the top of the containers stack.

Figure 1:
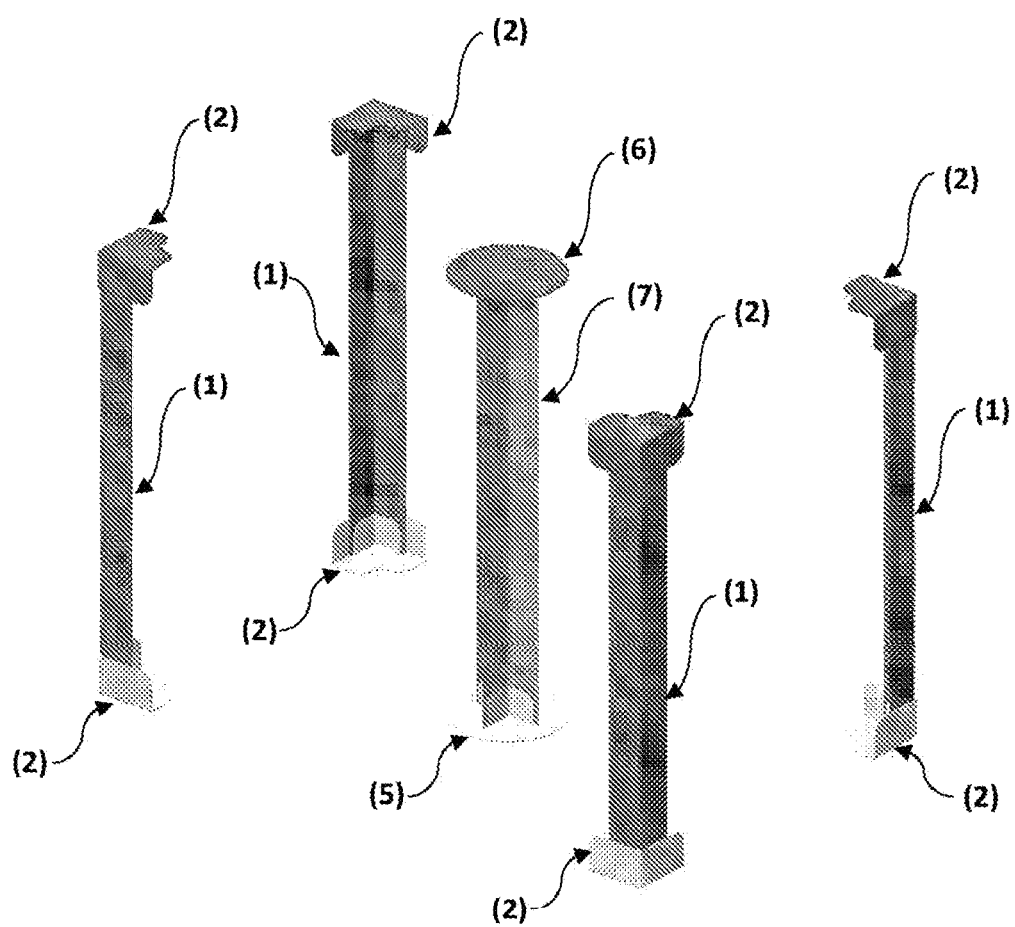
FIG. 1 represents a drawing in perspective view of the reinforcement system for one container section, according to an embodiment of the invention.
Figure 2:
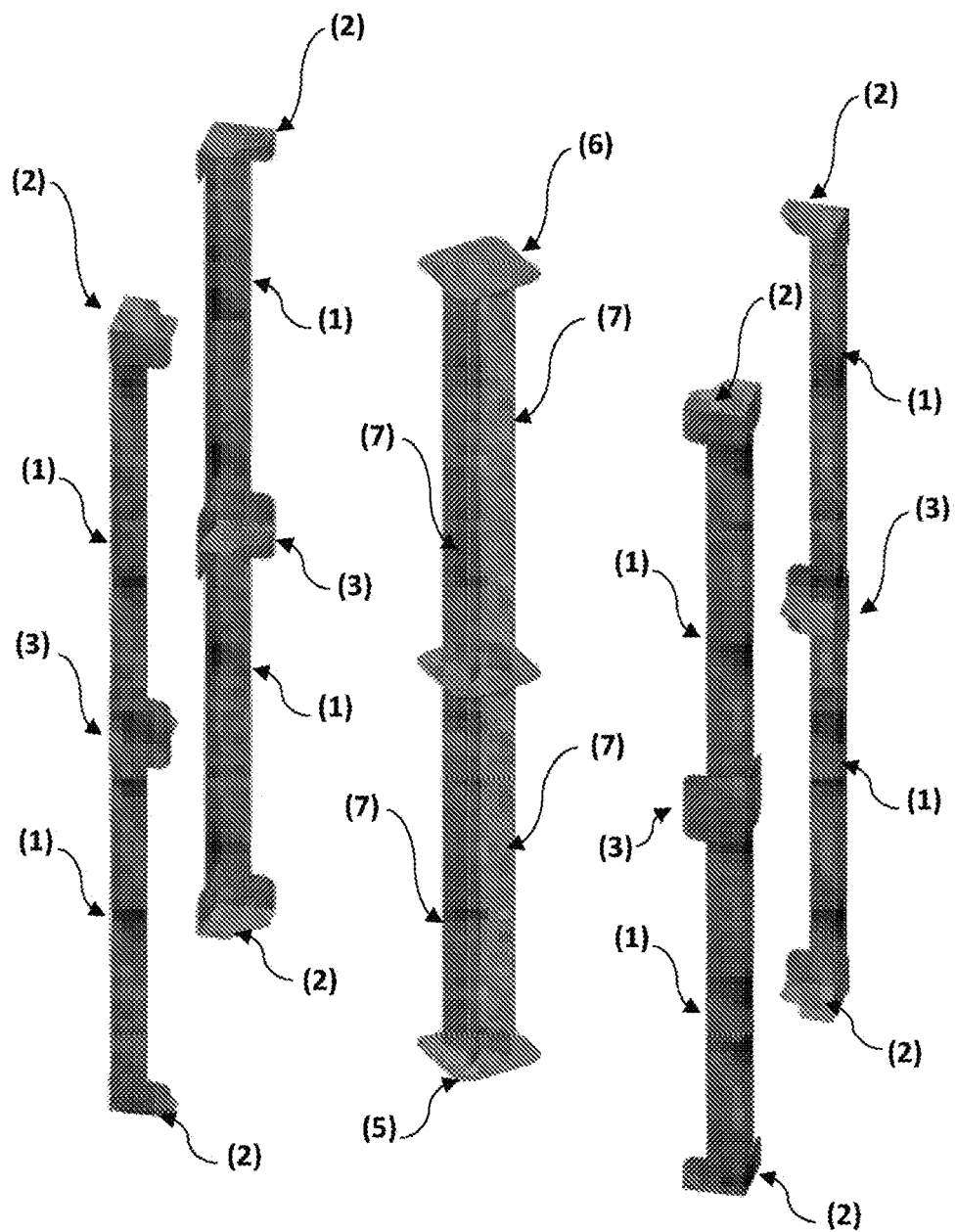
FIG. 2 represents a drawing in perspective view of the reinforcement system for at least two container sections, according to an embodiment of the invention.
Figure 3:
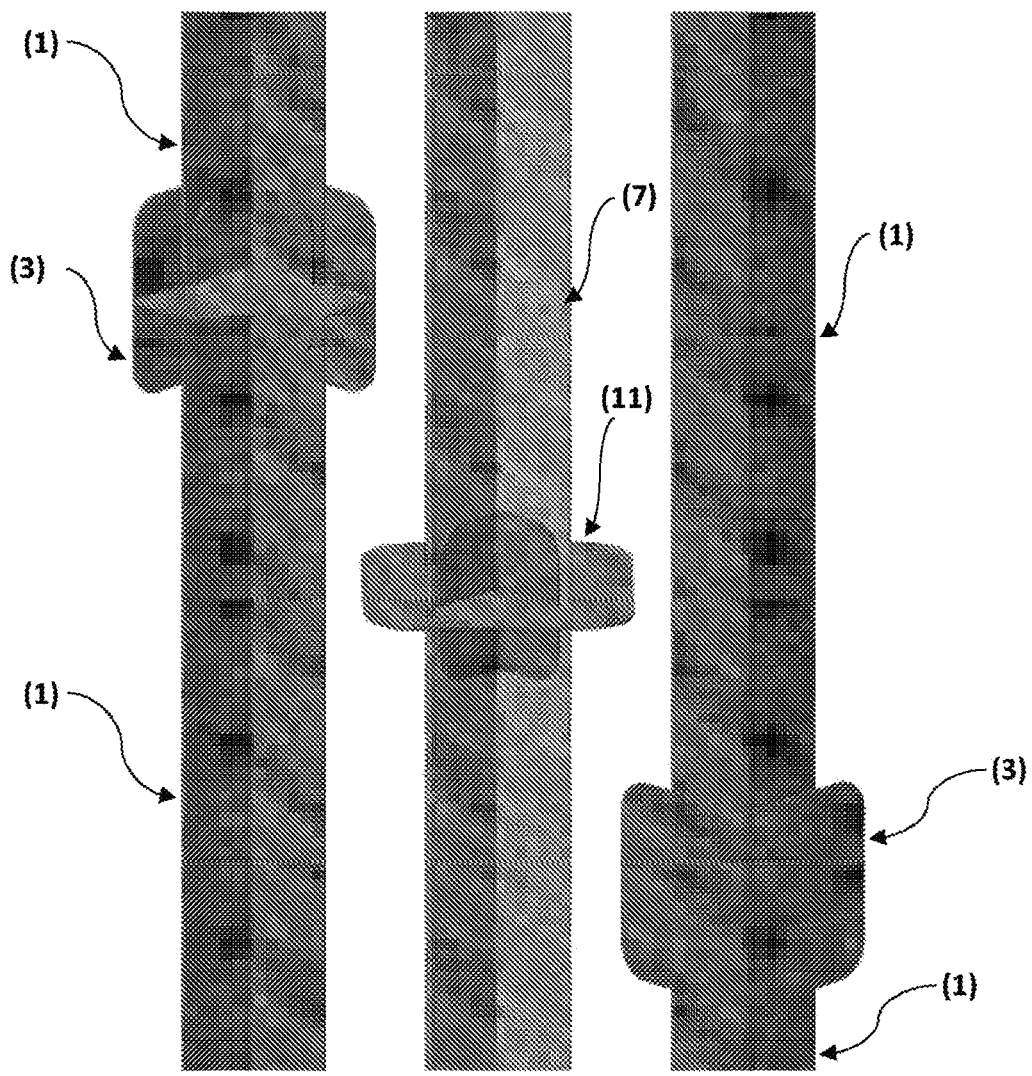
FIG. 3 represents a partial view of the reinforcement system showing intermediate shoulder elements and an intermediate support element, according to an embodiment of the invention.
Figure 4:
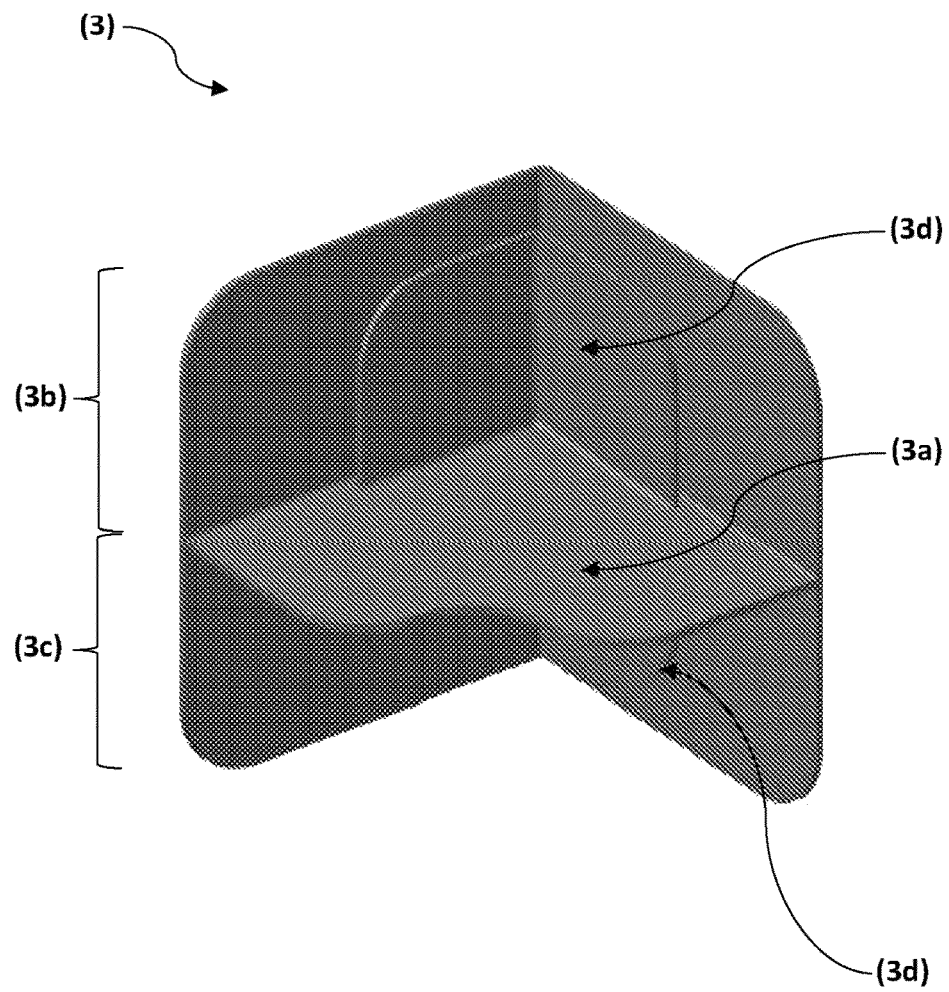
FIG. 4 represents a view of an intermediate shoulder element, according to an embodiment of the invention.
Figure 5:
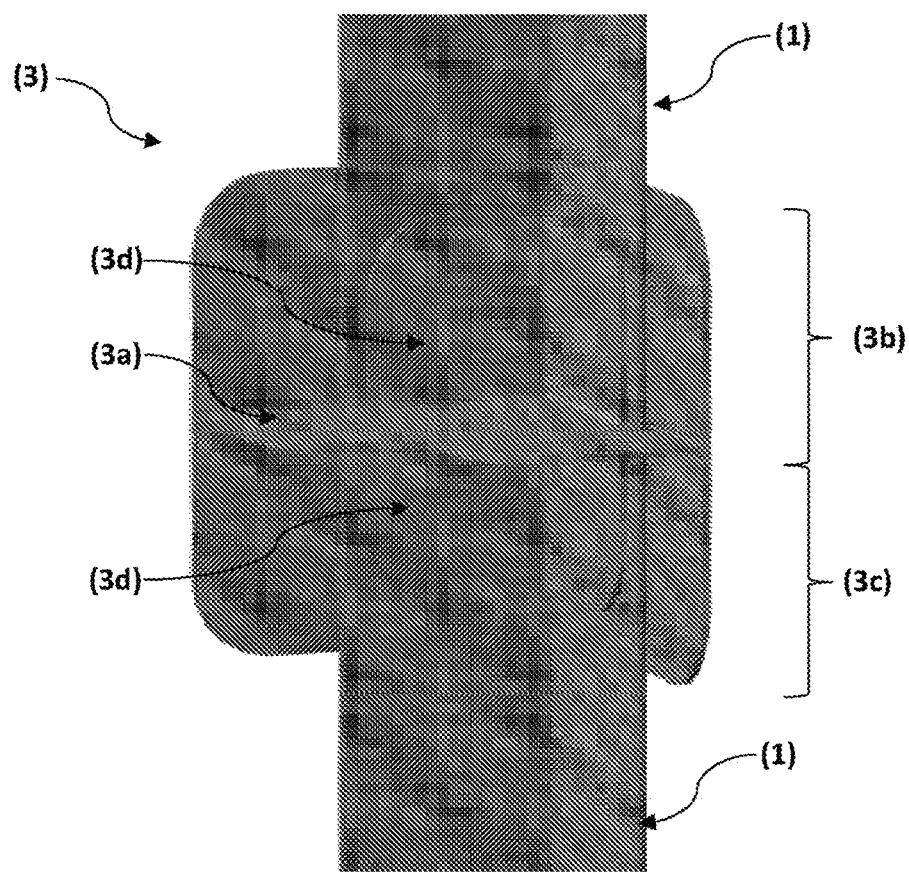
FIG. 5 represents a view of an intermediate shoulder element arranged together with two pillar elements, upper and lower, according to an embodiment of the invention.

The intermediate shoulder element (3), as an optional element to be used, as can be seen in FIGS. 4 and 5, is configured as a profile with an L-shape cross section, wherein the inner part is symmetrically separated by a plate (3*a*), arranged in the central part vertically to the internal surface of the profile, thus defining an upper portion (3*b*) and a lower portion (3*c*), in such a way that the lower portion (3*c*) is placed on a upper corner of a container, resting on the plate (3*a*) and on the upper portion (3*b*) in a lower corner of a container, which rests on the upper part of the plate (3*a*). In this way, both consecutive containers are secured at the corners, to prevent horizontal movement relative to each other. In the upper portion (3*b*) and the lower portion (3*c*) of the intermediate shoulder element (3), a clamping element (3*d*) of pillar element (1) is arranged, which is shaped as a profile with a L-cross section, whose dimension is less than or equal to the longitudinal dimension of the intermediate shoulder element (3). In this way, the pillar (1) is inserted between the internal wall of the intermediate shoulder element (3) and the respective clamping element (3*d*), both in the upper portion (3*b*) and lower portion (3*c*), keeping, in this way, it fixes the vertical position of the pillar element (1), as can be seen in FIG. 5.

To assemble the system, as mentioned above, the number of sections or rows of containers that will be stacked must be defined to determine if the implementation of intermediate shoulder elements (3) is necessary. If this is the case, at least one intermediate shoulder element (3) is placed in intermediate zones, between two container sections. Then the end shoulder elements (2) are installed in each of the corners, at the top and at the bottom of the stack. Also, a pillar element (1) of smaller dimension to the sum of the heights of the boxes along one edge of the containers stack is placed between the end shoulder elements (2), so that the boxes or containers absorb part of the load before the pillar (1) makes contact with the upper terminal shoulder (2) and with the intermediate shoulder (3).

Figure 11:
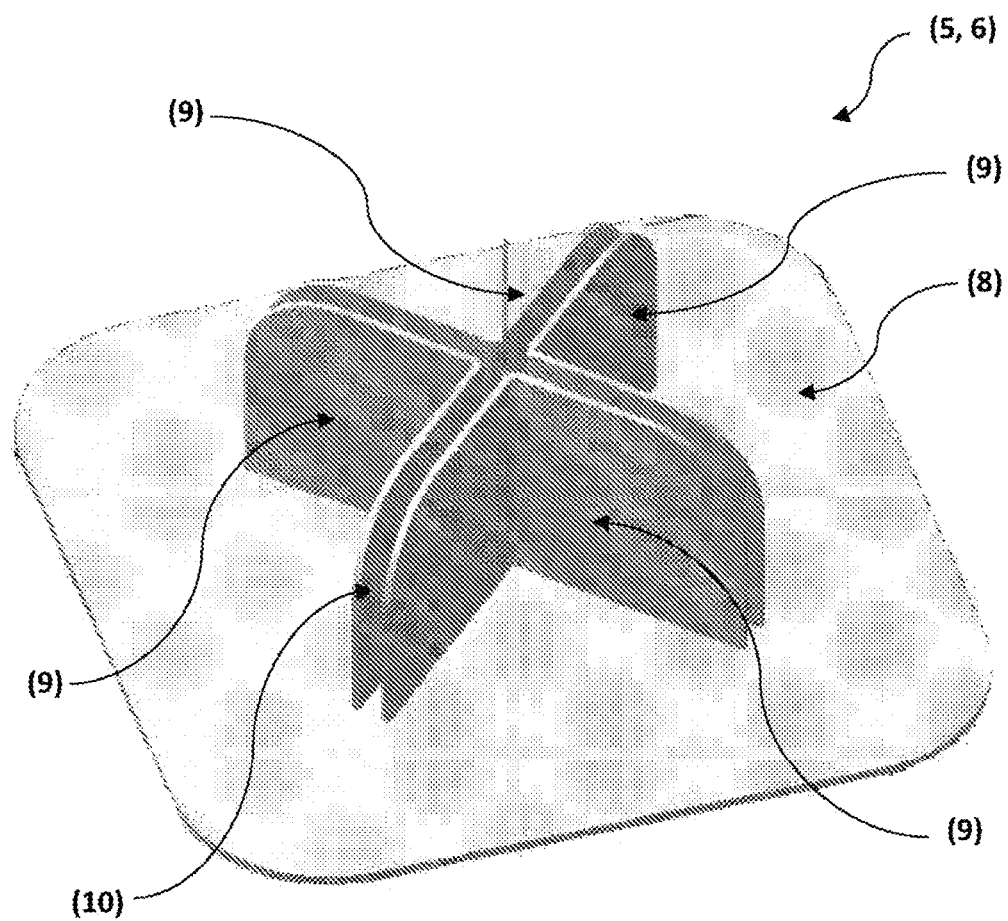
FIG. 11 represents a view of an end support for an internal column, according to an embodiment of the invention.
Figure 12:
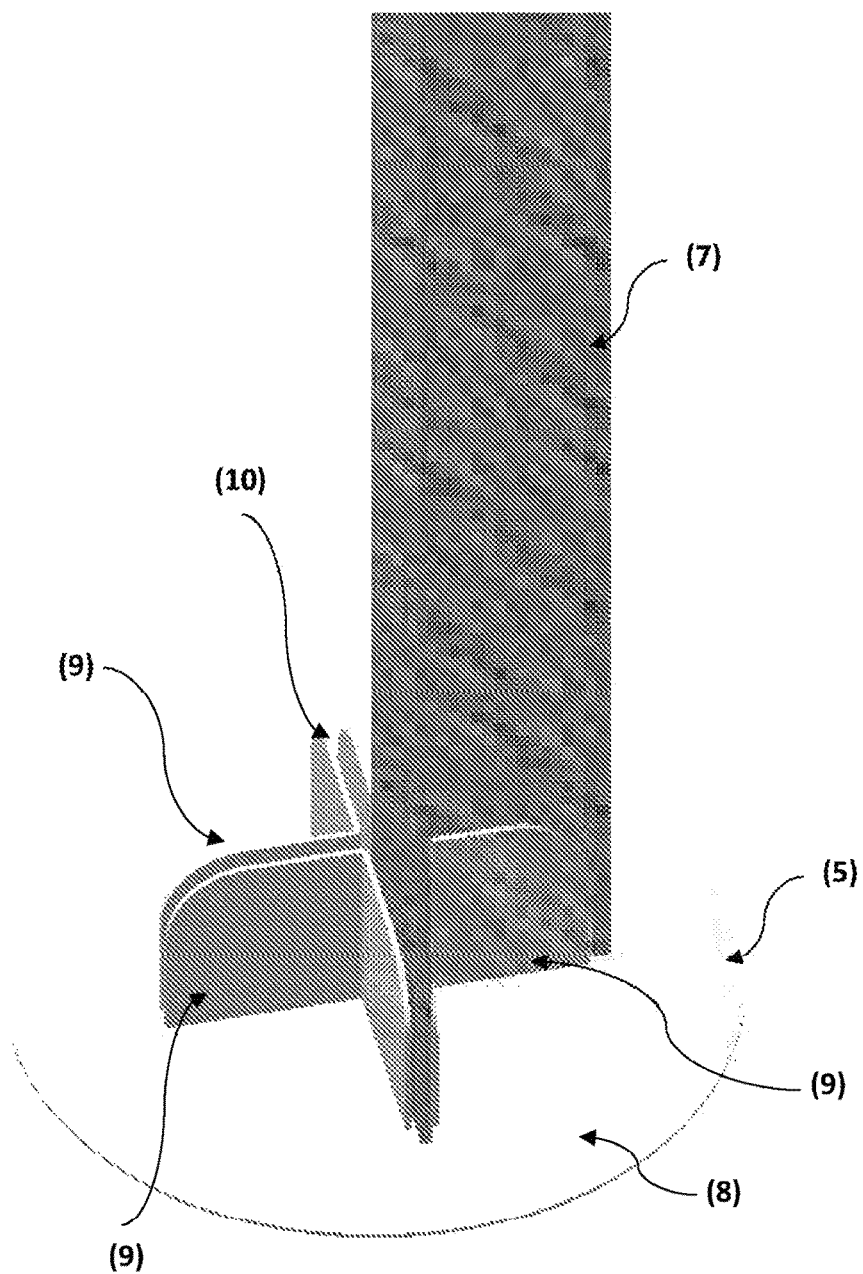
FIG. 12 represents a view of a lower end support for an internal column, according to an embodiment of the invention.
Figure 13:
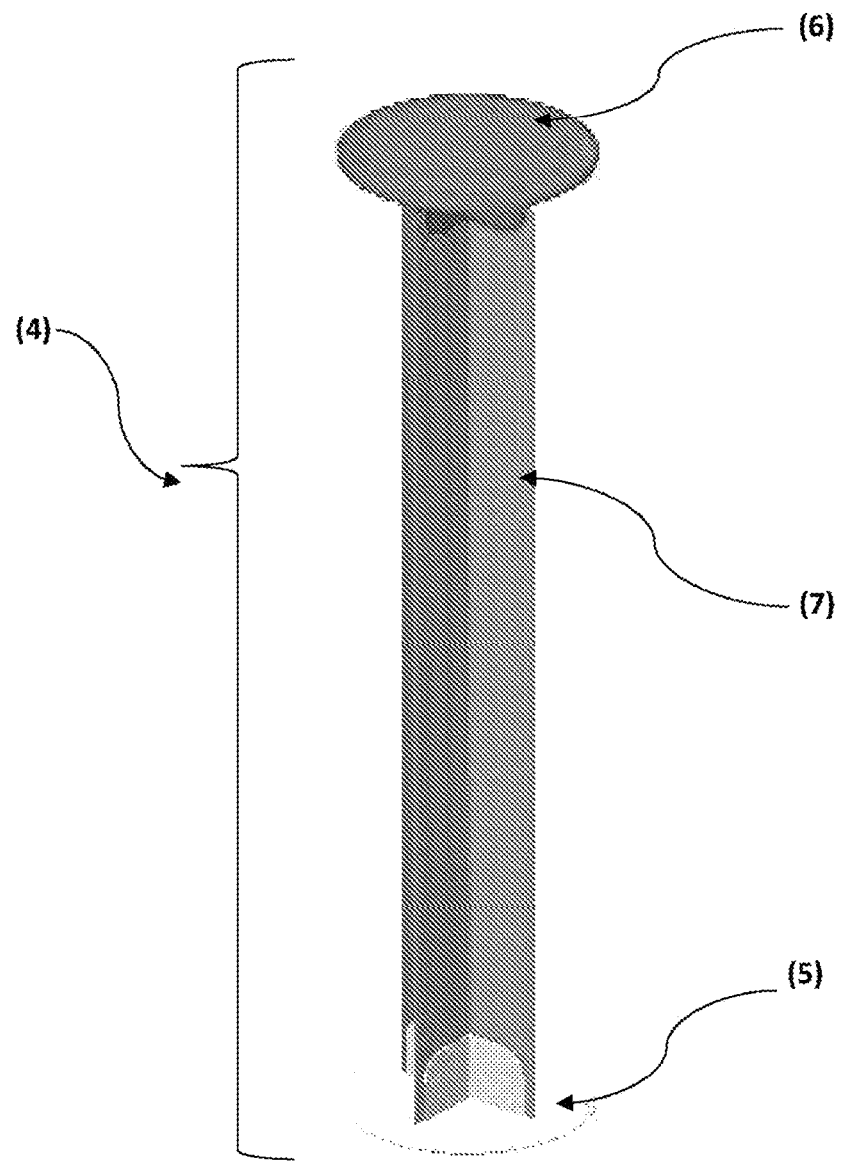
FIG. 13 represents a view of an internal column, according to an embodiment of the invention.
Figure 14:
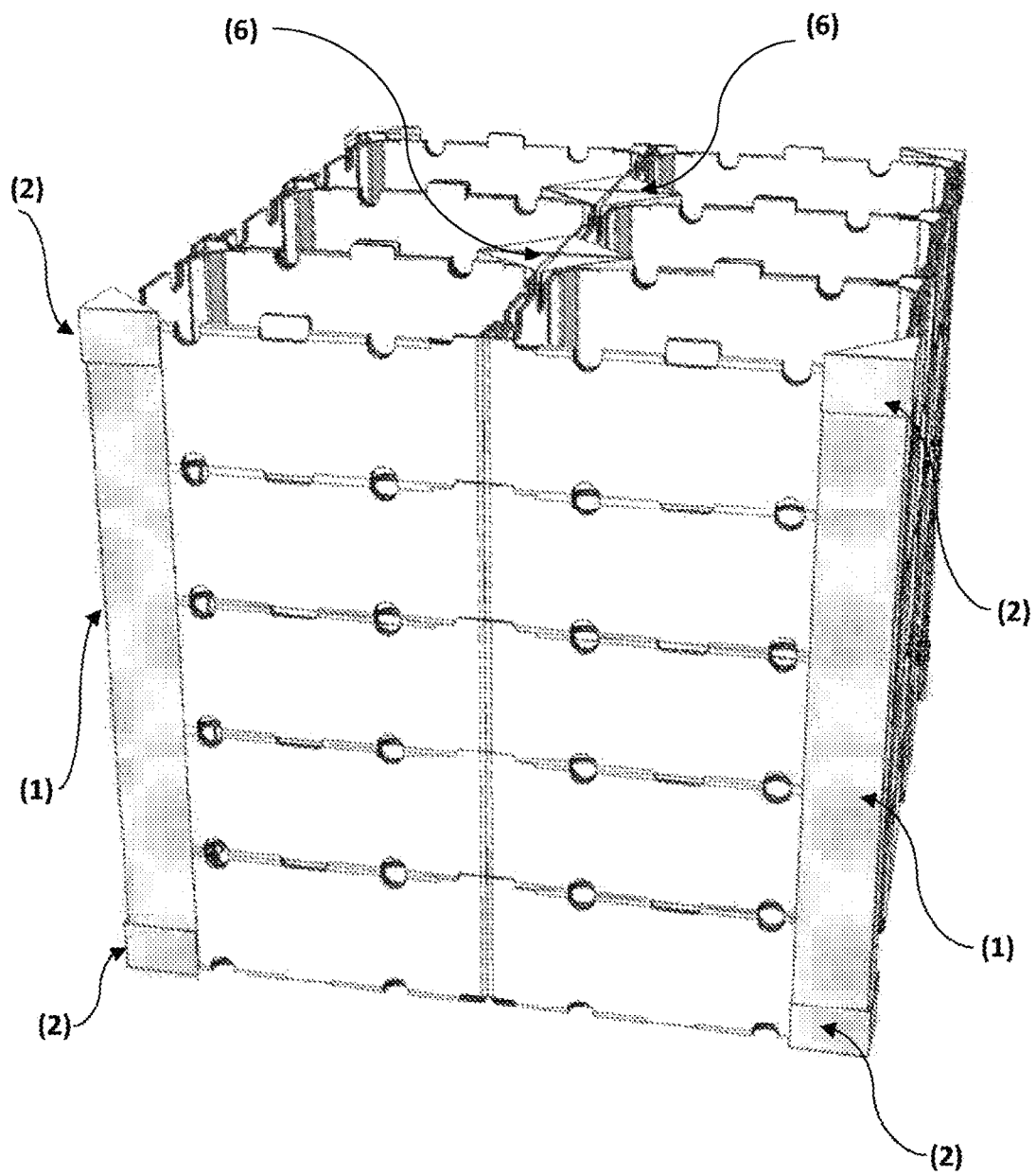
FIG. 14 represents a view of a set of stacked boxed in six columns, supported by end shoulder elements, one pillar element and one internal column, as an example, according to an embodiment of the invention.

In one embodiment of the invention, when it is required to stack more than one column of boxes or containers that make up the stack, an internal column (4) can be provided, which is arranged at the internal junction of four corners of boxes or containers. This internal column (4) comprises a lower end support (5), an upper end support (6) and at least one pillar (7), as seen in FIG. 13. The end support elements (5, 6), as seen in FIG. 11, are identical and are made up of a flat base (8) and at least four support pieces (9), preferably formed as a piece of a profile with an L-shape cross section. Said four pieces are arranged in vertically to the flat base (8), forming a cross-type structure, maintaining a space (10) between them, where said space (10) is configured for mounting at least one pillar (7). In this way, the at least one pillar (7), whit a L-shape cross section, fits into the space (10) defined by the support pieces (9) of the flat base (8), as can be seen in the example illustrated in FIG. 12.

In this last embodiment, to assembly the system, the lower end support (5) is placed, subsequently the boxes are placed together with at least one pillar (7), which is fitted in the respective space (10) defined by the support pieces (9), where said at least one pillar (7) rests on the flat base (8) of the lower end support (5). After the containers are placed together with at least one pillar (7), the upper end support (6) is inserted in the upper part, so that at least one pillar (7) fits into the respective space (10) defined by the support pieces (6) of the upper end support (6).

Figure 15:
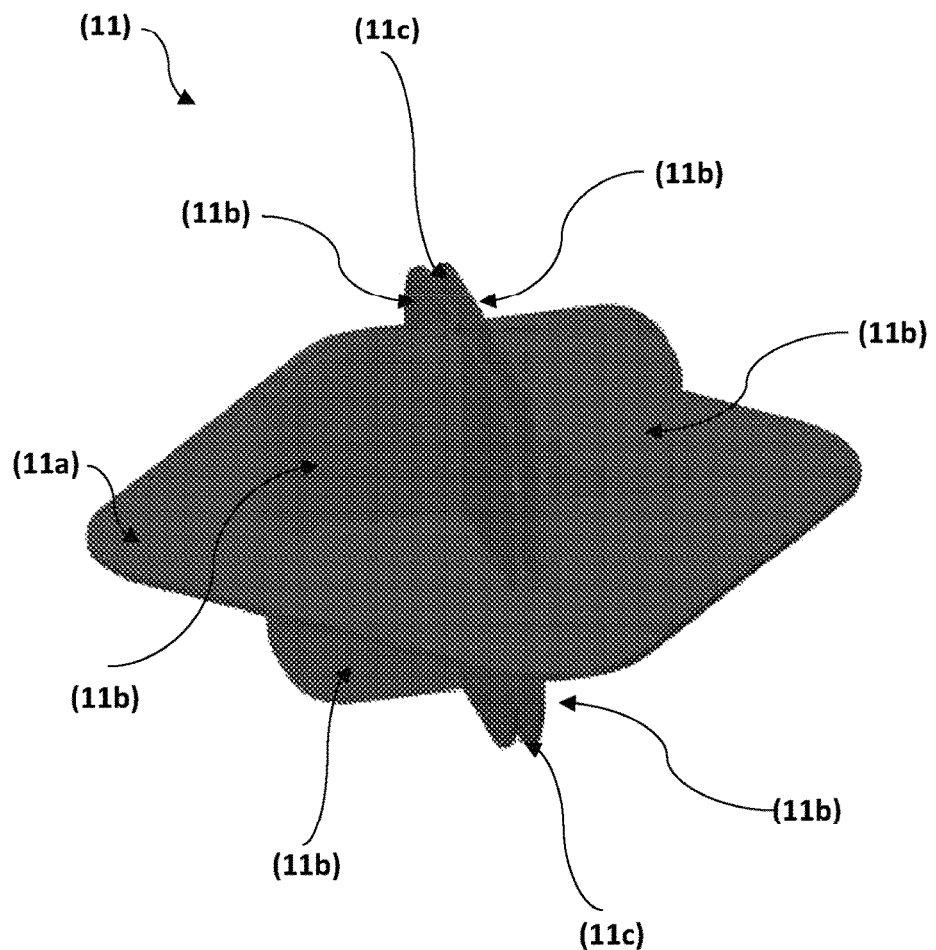
FIG. 15 represents a view of an intermediate shoulder element, according to an embodiment of the invention.
Figure 16:
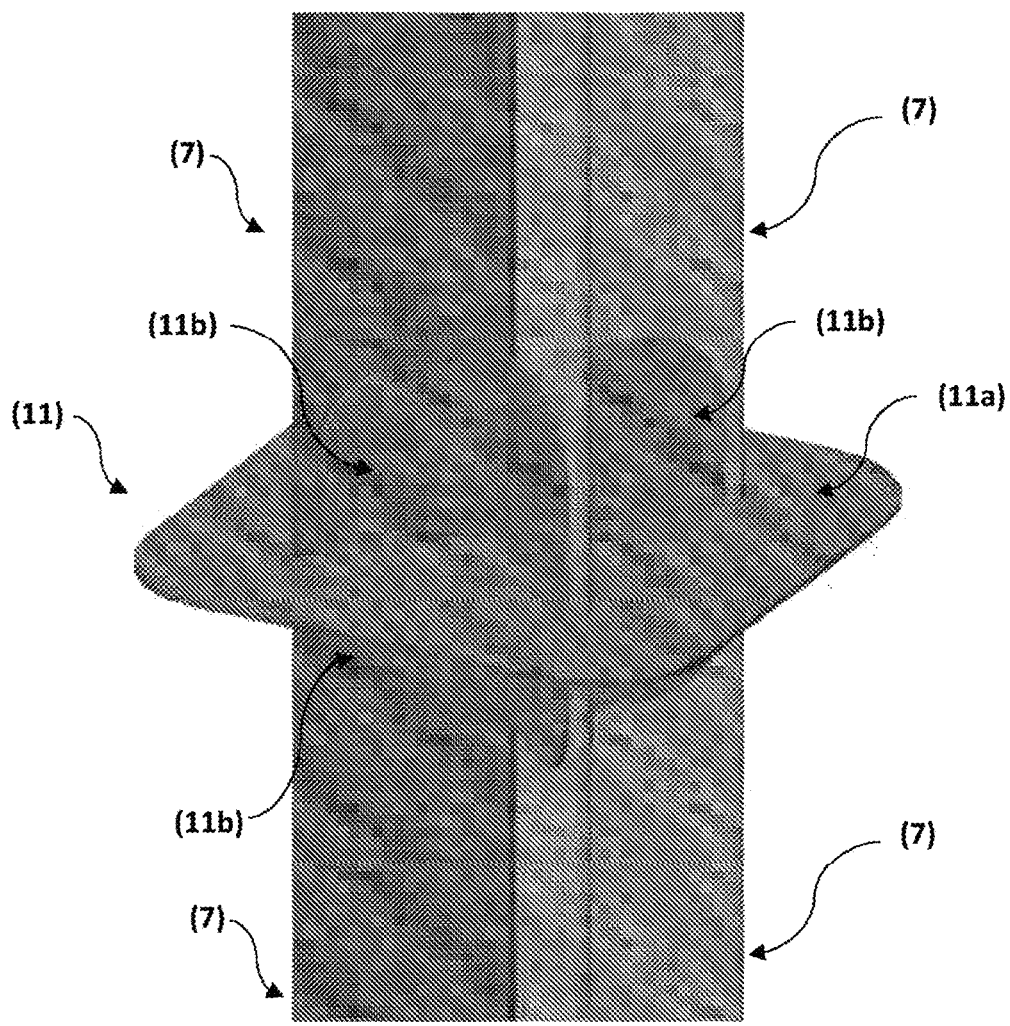
FIG. 16 represents a view of an intermediate support element arranged together with two pillars, according to an embodiment of the invention.

In one embodiment of the invention, in case of more container sections that make up the stack, at least one intermediate support element (11) can be arranged in the interior column (4). The structure of the intermediate support element (11) is similar to the structure of end support elements (5, 6) however, it has a symmetrical structure with respect to the cross structure. In this way, the intermediate support element is formed by a central plate (11a), which acts as a symmetry plane, where at least four support pieces (11b) are arranged on each of the sides of said central plate (11a)., preferably shaped as profile pieces with L-cross section. Said four support pieces (11b) are arranged vertically to the central plate (11a) forming a cross-type structure, maintaining a space (11c) between them, where said space (11c) is configured for the assembly of at least one pillar (7), as shown in FIG. 15. In this way, the pillars (7), whose section is L-shaped, fit together in the space (11c) defined by the support pieces (11), on both sides of central plate (11a) symmetrically, as can be seen in the example illustrated in FIG. 16.

Finally, the step of placing straps or tying the system and the containers can be incorporated, so that the portion of the container stack covered by the system is fixed or joined, and thus prevents the pillar elements from separating from the stack. From containers.

In this way, the described system allows the absorption of loads collaboratively with the containers, product of the stacking of one or more containers stack, without resulting in damage to the content and the containers themselves.

LIST OF REFERENCES (1) Pillar element
(2) End shoulder element
(2a) Closure plate
(2b) Clamping element of pillar
(3) Intermediate shoulder element
(3a) Plate
(3b) Upper portion
(3c) Lower portion
(3d) Pillar clamping element
(4) Internal column
(5) Lower end support
(6) Upper end support
(7) Pillar
(8) Flat base
(9) Support pieces
(10) Support space
(11) Intermediate support element
(11a) Central plate
(11b) Support pieces
(11c) Support space

The invention claimed is:

1. A reinforcement system for supporting stacked containers comprising:
   at least four pillar elements for positioning at one or more corners of a container stack;
   multiple end-shoulder elements for positioning at lower ends and upper ends of vertical corners of the container stack, the at least four pillar elements having a smaller dimension than a height along a vertical corner of the container stack between two of the multiple end-shoulder elements to allow containers of the container stack to absorb part of a load before the at least four pillar elements makes contact with an upper end-shoulder element of the multiple end-shoulder elements; and
   one or more internal columns, each internal column being configured to be positioned at an internal junction of four corners of four container stacks.

2. The reinforcement system of claim 1, wherein the at least four pillar elements have an elongated L-shape cross-section profile.

3. The reinforcement system of claim 2, wherein the multiple end-shoulder elements have an L-shape cross-section profile with one end open and an opposite end closed by a closure plate.

4. The reinforcement system of claim 2, wherein a pillar-clamping element of the at least four pillar elements is arranged at an inner part of the multiple end-shoulder elements, the pillar-clamping element having an L-shape cross-section profile with a dimension less than or equal to a longitudinal dimension of the multiple end-shoulder elements.

5. The reinforcement system of claim 1 further comprises:
   one or more intermediate shoulder elements having an L-shape cross-section profile, an interior part of the one or more intermediate shoulder elements being symmetrically separated by a plate positioned vertically in a central part of an inner surface of the L-shape cross-section profile and defining an upper portion and a lower portion, the lower portion being configured to be placed on an upper corner of a container, the plate and the upper portion being configured to have another container rest on an upper part of the plate.

6. The reinforcement system of claim 5 further comprises a pillar clamping element positioned at the upper portion and the lower portion of the one or more intermediate shoulder elements and dimensioned with a length less than or equal to a length of the one or more intermediate shoulder elements.

7. The reinforcement system of claim 1, wherein each internal column comprises a lower-end support, an upper-end support, and a pillar.

8. The reinforcement system of claim 7, wherein the lower-end support and the upper-end support are identical and are formed by a flat base and at least four support pieces, each support piece having an L-shape cross-section profile.

9. The reinforcement system of claim 8, wherein the four support pieces are arranged vertically on the flat base to form a cross-type structure and maintain a space between the four support pieces, the space being configured for placement of at least one pillar therein and to allow the L-shape cross-section of the at least one pillar to fit into the space.

10. The reinforcement system of claim 9 further comprises at least one intermediate support element, the at least one intermediate support element including:
   a central plate that is configured as a plane of symmetry; and
   at least four support pieces on each side of the central plate, each support piece having an L-shape cross-section profile, the at least four support pieces being vertically arranged relative to the central plate and forming a cross-type structure to maintain a space between the at least four support pieces, the space being configured for mounting the at least one pillar.

* * * * *